United States Patent Office 2,879,272
Patented Mar. 24, 1959

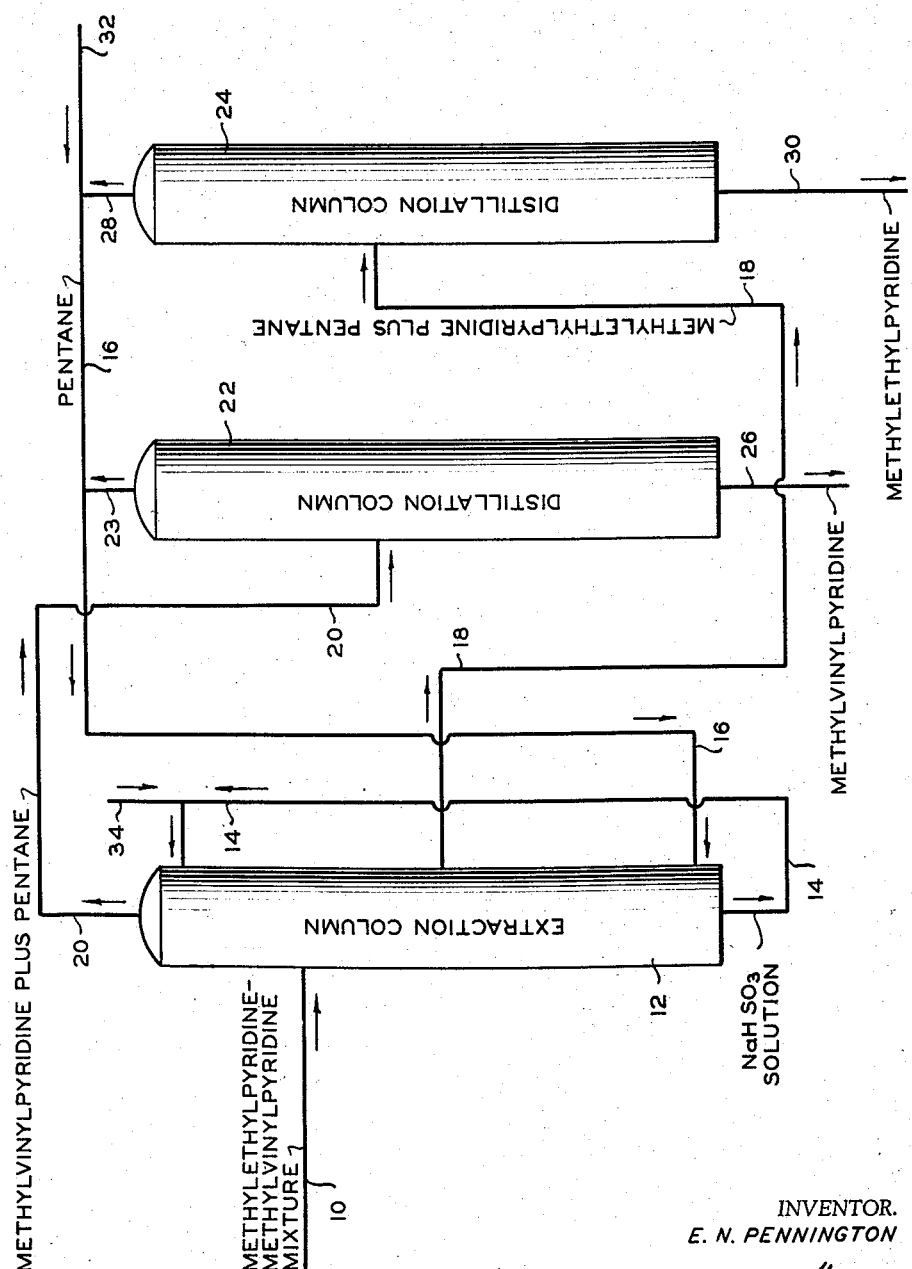

2,879,272

PURIFICATION OF VINYLPYRIDINES

Edward N. Pennington, Bartlesville, Okla., assignor to Phillips Petroleum Company, a corporation of Delaware Application March 11, 1957, Serial No. 645,327

8 Claims. (Cl. 260—290)

This invention relates to the separation of alkylpyridines from alkenylpyridines. In preferred embodiments the invention pertains to the purification of vinylpyridines from admixture with ethylpyridines.

This is a continuation-in-part of my application filed January 3, 1952, and having Serial No. 264,810 for Purification of Vinylpyridines, now abandoned.

The production of alkenylpyridines, especially vinylpyridines, has recently become of much industrial importance. Vinylpyridines can be prepared by condensation of formaldehyde with 2- and 4-alkylpyridines to form the monomethylol compounds followed by dehydration of same to produce corresponding vinylpyridines or substituted vinylpyridines. A more direct procedure, and one which will probably be the most important industrially, is the direct catalytic dehydrogenation of alkylpyridines to the corresponding alkenylpyridines. Thus, for example, 2-methyl-5-ethylpyridine can be efficiently dehydrogenated to produce the corresponding 2-methyl-5-vinylpyridine. This can be done, for example, by passing an admixture of from 2 to 15 weights of steam per weight of 2-methyl-5-ethylpyridine at a temperature within the range of 1000 to 1300° F., approximately atmospheric pressure, and a space velocity of 1 to 5 liquid volumes 2-methyl-5-ethylpyridine charged per volume of catalyst per hour, over a catalyst exemplified by one composed of 93 percent iron oxide, 5 percent chromium oxide, and 2 percent potassium hydroxide, as described in further detail in U.S. Patent 2,769,811 of John E. Mahan, issued November 6, 1956. The dehydrogenation effluent contains in addition to hydrogen, principally unchanged 2-methyl-5-ethylpyridine and 2-methyl-5-vinylpyridine product. Also present are small quantities of pyridine, 2-picoline, 3-picoline, 2,5-lutidine, 3-ethylpyridine and 3-vinylpyridine.

Purification of vinylpyridines contained in this or other mixtures presents many difficulties. These arise because of the great ease with which vinylpyridines polymerize, the closeness of boiling points between vinylpyridines and the corresponding ethylpyridines, and the formation of water azeotropes and other difficultly separable fractions on fractional distillation of such mixtures.

An object of this invention is to separate alkenylpyridines from alkylpyridines. Another object of the invention is to purify vinylpyridines. A further object is to separate an alkenylpyridine from admixture with the corresponding alkylpyridine. Yet another object is to effect the separation and purification referred to while minimizing polymerization of the alkenylpyridine. A still further object is to purify 2-methyl-5-vinylpyridine. Further objects and advantages of the invention will be apparent to one skilled in the art from the accompanying disclosure and discussion.

It has recently been discovered that an excellent separation can be made of alkenylpyridines from alkylpyridines by contacting an admixture of same with an aqueous solution which has a pH in the range of 2 to 7, as described in U.S. Patent 2,716,120 of Donald M. Haskell, issued August 23, 1955, the disclosure of which is incorporated herein by reference. The alkylpyridine is much more soluble than the corresponding alkenylpyridine in aqueous acid solutions having the characteristics just defined, and therefore a separation can be made between the two. In accordance with the Haskel invention in preferred embodiment, the pyridine mixture, by which is meant the organic mixture containing at least an alkylpyridine and the corresponding alkenylpyridine, is passed countercurrently to an aqueous solution containing from 1 to 60 weight percent of an acid and having a pH between 2.5 and 4.5 prior to contact with said pyridine mixture. The alkylpyridine is selectively dissolved in the aqueous solution so that an aqueous solution rich in alkylpyridine is obtained on the one hand and a pyridine material rich in alkenylpyridine is obtained on the other hand. The purification can be carried to whatever extent is desired, so that essentially pure alkylpyridine can be separated as one product and essentially pure alkenylpyridine can be recovered as the other product. However, many contacting stages are required to obtain high purity products. The separation is aided by refluxing pure alkylpyridine to the alkylpyridine-rich solvent in a counterflowing extraction system. Difficulties arise in the process described in empolying reflux to maximum advantage, and because of high mutual solubilities of acid solvent and pyridine phases additional steps are required to obtain complete separation of phases. My invention is an improvement in said process, whereby the difficulties mentioned are obviated, operational steps and equipment are reduced, and high separation efficiency is attained.

In accordance with this invention, a mixture of alkylpyridines and alkenylpyridines is resolved by estabishing a countercurrent, intimate-contact flow of an aqueous acid solution and an organic liquid, wherein the mixture of pyridines is introduced into said flow at a point removed from the end of said acid solution introduction. At a point between the point of introduction of the pyridine mixture and the point of organic liquid introduction, a portion of the flowing organic liquid is withdrawn having dissolved therein pyridine enriched in alkylpyridine and the remainder of the flowing organic liquid having dissolved therein pyridines enriched in alkenylpyridines is withdrawn from the end of acid solution introduction.

This invention is applicable to alkylpyridines containing at least one alkyl group having at least 2 carbon atoms, and to alkenylpyridines corresponding thereto. Di-, tri-, and tetraalkyl pyridines with the alkyl substituents being present in various positions on the pyridine nucleus can be separated from corresponding alkenylpyridines wherein the double bond can be in a vinyl group or in the alpha of the possible positions in carbon chains of three and more carbon atoms in length. 2-methyl-5-vinylpyridine and 2-methyl-5-ethylpyridine make up one group which it is frequently desired to separate in accordance with this invention. Other examples of alkylpyridines which can be separated from alkenylpyridines are: 2-ethyl-4-ethylpyridine, 2-ethylpyridine, 2-ethyl-5- ethylpyridine, 3-ethylpyridine, 3-propylpyridine, 2-n-amylpyridine. Suitable alkenylpyridines which can be purified in accordance with the invention are, for example, 2-vinyl-4-ethylpyridine, 2-ethyl-4-vinylpyridine, 2-vinylpyridine, 3-propenylpyridine, 2-n-amylene pyridine. The various alkyl and alkenylpyridines can have non-interfering groups attached to the pyridine nucleus, for example a chlorine or nitro group substituted on a carbon atom of the nucleus. Usually the invention is applied to those alkyl and alkenylpyridines containing a total of not over 10 carbon atoms in side chains and best results are customarily obtained with mixtures containing a monovinyl or monopropenyl pyridine and the corresponding ethyl or propyl pyridine, with or without one or two methyl groups thereon.

As stated heretofore the pH of the aqueous extracting solution must be in the range of 2 to 7 to obtain the selective separation action of this invention. It should be no lower than 2 in order to minimize polymerization of the vinyl compounds, corrosion of equipment, and difficulty of recovering the pyridine compounds from the acid solution. A pH within the range of 2 to 5 is almost always used, and most frequently a pH within the range of 2.5 to 4.5. I have found that a pH of about 3.5, varying within the range of 3.2 to 3.8, gives optimum results in most cases. The acid solution should be buffered if necessary to bring it to the desired pH range with any particular acid and any given concentration of acid. For greatest ease of recovery of alkylpyridine from the aqueous acid, I much prefer that the pH be at least 3. Thus it can be stated that my preferred pH range is 3 to 4.5.

By acid are included both the mineral and the organic acids, and acid salts thereof, i.e., salts containing at least one hydrogen atom ionizable to give hydrogen ions in aqueous solution. By way of example can be mentioned sulfurous, sulfuric, phosphoric, phosphorous, hydrochloric, citric, oxalic acids, sodium bisulfite, sodium bisulfate, ammonium bisulfite, ammonium bisulfate, and acid salts of any of the polybasic acids especially those mentioned above. It is particularly preferred to use aqueous solutions of inorganic acids or acid salts thereof. Solutions of these acids can be buffered if desired by known means, including addition of less than the equivalent amount of a base, e.g., NaOH or NH$_3$, and/or addition of salts. Aqueous solutions of potassium acid tartrate, potassium acid phthalate, or sodium acid succinate can be used alone or with added acid as extracting agents, and will have good resistance to pH change, i.e. will be well buffered. In my process wherein the acid solution is continuously returned to the extraction after removal of alkylpyridine therefrom, the removal step of the process, described in further detail hereinbelow, can be operated so that the acid solution retains some pyridine compounds which will serve to buffer the solution. However, this tends to decrease the purity of the alkenylpyridine product and therefore complete removal of alkylpyridine from the aqueous solution is preferred.

The accompanying drawing shows diagrammatically one arrangement of apparatus elements and flow of materials therethrough suitable for practicing the invention in a preferred modification. Various auxiliary items of equipment such as valves, pumps, etc. can be supplied by those skilled in the art and have therefore not been shown. It will be apparent that numerous modifications can be made of the specific details shown without departing from the invention.

A mixture of 2-methyl-5-vinylpyridine and 2-methyl-5-ethylpyridine to be separated is introduced via line 10 into the single extraction-separation column 12 at a point below the top. This column is provided with suitable apparatus elements, such as packing, bubble caps, stirred agitation zones alternated with settling zone, Koch "Kaskade" trays, or the like adapted to effect intimate countercurrent contact of two at least partially immiscible liquids. Into the top of column 12 from line 14 is passed an aqueous solution of sodium bisulfite, which flows downwardly through the column countercurrent to upflowing organic phase. Into the bottom of column 12 from line 16 is introduced liquid pentane, usually normal pentane, which flows up through the column countercurrent to the downwardly flowing aqueous phase.

In the upper portion of column 12 the aqueous sodium bisulfite preferentially dissolve methylethylpyridine. In the bottom portion of column 12, the upwardly flowing pentane introduced from line 16 serves to strip the dissolved methylethylpyridine from the aqueous solution. Suitable means are provided within column 12 at at least one point for separating phases from each other. The one point at which this must be done is somewhere near the middle, and from that point is withdrawn through line 18 a portion of the organic phase. The art is familiar with such separation means, one such means being an inverted doughnut which will collect the raffinate phase and allow the extract phase to pass downwardly. The amount of withdrawn material can be regulated by suitable proportioning means. All of the raffinate can be withdrawn and the desired portion returned to the column, or even two columns can be employed. From the foregoing discussion it will be seen that this material withdrawn through line 18 comprises pentane and methylethylpyridine dissolved therein. Only a part of the organic phase is withdrawn at this point and the balance is caused to flow upwardly entirely through the column in accordance with my invention. This results in a refluxing action, whereby methylethylpyridine first dissolved in the downflowing aqueous phase in the upper part of the column and carried into the bottom part of the column and then dissolved from that aqueous phase into the pentane phase, is again, as the organic phase flows through the upper part of the column, transferred from the organic pentane phase into the aqueous phase thereby displacing methylvinylpyridine which has become dissolved in the aqueous phase. The presence of the pentane in the upper part of column 12 also avoids appreciable solution of the aqueous sodium bisulfite in the methylvinylpyridine product issuing from the top of the column.

As a result of the refluxing, and the avoidance of solution of aqueous sodium bisulfite in the upflowing organic phase, there is withdrawn from the top of column 12 through line 20 a solution of methylvinylpyridine in pentane which is essentially free of dissolved aqueous sodium bisulfite and which is relatively free from methylethylpyridine. The purity of the methylvinylpyridine of course depends on the number of extraction stages and the efficiency of the extraction system which in turn is affected by the reflux ratio, the temperature, the particular acid and quantity thereof, the pH, the ratios of aqueous solvent to pyridine feed to pentane, and various other factors which will be understood by those skilled in the art who have read the present disclosure. The top product in line 20 is introduced into distillation column 22 of any conventional design, from which pentane is taken overhead through line 23 and reintroduced into line 16 for reuse, and from which methylvinylpyridine product is recovered as bottoms through line 26. Care should be taken in the design and operation of column 22 to minimize polymerization of methylvinylpyridine, and this can involve the use if desired of two columns, the first a flash distillation for removing the bulk of the pentane and the second a vacuum distillation so that the temperature of the methylvinylpyridine product will be kept as low as possible.

The portion of the pentane phase withdrawn from column 12 through line 18 is passed into distillation column 24. From column 24 pentane is removed overhead via line 28 and passed through line 16 for reuse in column 12. Make-up pentane can be added through line 32. Methylethylpyridine is recovered from the bottom of column 24 through line 30 as a final product of the process.

Sodium bisulfite solution, freed from most or all of its methylethylpyridine content, is withdrawn from the bottom of column 12 through line 14 and passed with the aid of a pump not shown back to the top of column 12 for reuse. Make-up aqueous solution is added through line 34.

In the foregoing description of a preferred embodiment of my invention pentane was employed as the medium for recovering dissolved methylethylpyridine from aqueous solution, refluxing same within the extraction zone, and minimizing solution of aqueous phase in the organic phase. Said pentane is to be considered only as a preferred organic liquid for performing these functions. Any organic liquid sufficiently immiscible with the aqueous phase and essentially inert with respect to the other components of the system can be used. While chlorinated hydrocarbons and many other organic liquids will be understood by those skilled in the art to be within the scope of the liquid which can be used for these purposes, hydrocarbons are preferred and particularly paraffins of 3 to 8 carbon atoms per molecule are preferred. A suitable hydrocarbon is one or more of the lower paraffins, such as pentane, propane, n-octane, 2,2,4-trimethylpentane, etc. However, open-chain olefins, cycloparaffins and cycloolefins, and aromatics can also be used.

The extraction temperature can be varied over a considerable range while still retaining the advantages of this invention. Ordinarily a temperature from 32 to 120° F. is satisfactory. Lower temperatures, although operable so long as freezing is avoided, are unnecessary. Temperatures above 120° F. are operable but reduce the solubility of alkylpyridine in the acidic aqueous phase. A preferred temperature range is 80 to 120° F. The lower part of column 12 can be operated at the same temperature or within the same general range of temperature as the upper portion thereof viz., those temperatures just discussed. However, the lower portion of column 12 can also be operated at somewhat higher temperatures, for example 200° F. This can readily be accomplished by introducing the pentane at a sufficiently high temperature, or by providing other suitable heating for the lower part of column 12. In such case, suitable means should be provided for keeping the temperature of the upper portion of column 12 somewhat lower, preferably within the ranges hereinbefore discussed. As mentioned before, it is important for the satisfactory operation of the pentane or other organic solvent in the system that the pH of the aqueous phase not be too low, and it is preferably at least 3. Any pressure can be used so long as the organic phase and the aqueous phase are maintained in the liquid state.

It is preferred that the weight ratio of acidic aqueous solvent to the pyridine mixture to be separated be not less than 15:1 and not more than 25:1, although proportions somewhat outside these ranges can be used if desired. The weight ratio of pentane or other organic solvent used to the pyridines mixture to be separated ought usually to be within the range of 3:1 to 10:1, with 5:1 often being about optimum. The pentane stream withdrawn intermediate the ends of the extraction-separation column containing alkylpyridine product dissolved therein, will usually constitute from one-sixth to one-third of the total of (a) said stream plus (b) the stream of pentane and alkenylpyridine withdrawn from the top of the column.

Mixtures of methylvinylpyridine and methylethylpyridine can be separated into pure components, 98 percent, by extraction with sodium bisulphite solution and stripping with light paraffins. The products are subsequently separated from the stripping fluid by fractionation. This process effects the pyridine separation with a minimum of polymerization.

A mixture containing 50 weight percent methylvinylpyridine and 50 weight percent methylethylpyridine is separated by operating in accordance with my invention into a 98 weight percent methylvinylpyridine and a 98 weight percent methylethylpyridine products by extraction with an 18.8 weight percent sodium bisulphite solution with a flow ratio of 21.8 pounds of solvent per pound of pyridine mixture, and stripping with n-pentane with a flow ratio of 4.9 pounds n-pentane per pound of pyridine mixture, the side stream of methylethylpyridine containing one half the pyridine feed and a proportionate amount of n-pentane. The column is operated at 100° F. and 25 p.s.i.a. The distillation columns 22 and 24 are operated at 105° F. overhead and 18 p.s.i.a.

The invention has been described with respect to various preferred embodiments thereof. However, numerous variations can be made in the details herein given without departing from the invention.

I claim:

1. The method of resolving a mixture of 2-methyl-5-vinylpyridine and 2-methyl-5-ethylpyridine which comprises establishing a countercurrent, intimate-contact flow of an acidic aqueous solution of sodium bisulfite having an pH in the range of 2 to 7 and normal pentane; introducing said mixture of pyridines into said flow at a point removed from the end of aqueous solution of sodium bisulfite introduction; withdrawing from a second point in said flow, removed from and between said first-mentioned point and the end of normal pentane introduction, a portion of the flowing pentane phase having dissolved therein pyridines enriched in said 2-methyl-5-ethylpyridine, and withdrawing from the end of aqueous solution of sodium bisulfite introduction normal pentane having dissolved therein pyridines enriched in 2-methyl-5-vinylpyridine.

2. A method of resolving a mixture of 2-methyl-5-vinylpyridine and 2-methyl-5-ethylpyridine which comprises establishing a countercurrent, intimate-contact flow of normal pentane and an acidic aqueous solution of a material selected from the group consisting of inorganic acids and acidic inorganic salts thereof, said solution having a pH in the range of 2 to 7; introducing said mixtures of pyridines into said flow at a point removed from the end of aqueous solution introduction; withdrawing from a second point in said flow, removed from and between said first-mentioned point and the end of normal pentane introduction, a portion of the flowing pentane phase having dissolved therein pyridines enriched in said 2-methyl-5-ethylpyridine; and withdrawing from the end of aqueous solution introduction normal pentane having dissolved therein pyridines enriched in 2-methyl-5-vinylpyridine.

3. The method of claim 2 wherein the aqueous solution is an aqueous solution of an inorganic acid.

4. A method of resolving a mixture of 2-methyl-5-vinylpyridine and 2-methyl-5-ethylpyridine which comprises establishing a countercurrent, intimate-contact flow of an acidic aqueous solution of a material selected from the group consisting of inorganic acids and inorganic acid salts thereof having a pH in the range of 2 to 5 and a liquid paraffin hydrocarbon of 3 to 8 carbon atoms per molecule; introducing said mixture of pyridines into said flow at a point removed from the end of aqueous solution introduction; withdrawing from a second point in said flow, removed from and between said first-mentioned point and the end of paraffin introduction, a portion of the flowing paraffin phase having dissolved therein pyridines enriched in said 2-methyl-5-ethylpyridine; and withdrawing from the end of aqueous solution introduction paraffin having dissolved therein pyridine enriched in 2-methyl-5-vinylpyridine.

5. A method for resolving a mixture of an alkenylpyridine having solely alkyl substituents and at least one alkenyl substituent with the double bond in the alpha position and having only 2 to 10 carbon atoms in side chains and an alkylpyridine having solely alkyl substituents and having 1 to 10 carbon atoms in side chains, said method comprising flowing through a single elongated vertical liquid-liquid contacting column (a) downwardly an acidic aqueous solution of a material selected from the group consisting of inorganic acids and inorganic acid salts thereof having a pH in the range of 2 to 5, and (b) upwardly a liquid paraffin hydrocarbon having from 5 to 8 carbon atoms per molecule; introducing said mixture of pyridines into said column at a point between the top and the midpoint thereof; withdrawing from about the midpoint of said column a portion of the upwardly flowing liquid paraffin having dissolved therein pyridine material enriched in alkylpyridines; withdrawing from an upper level of said column liquid paraffin having dissolved therein pyridine material enriched in alkenylpyridine; and withdrawing aqueous acid solution denuded of pyridine from the bottom of said column and re-introducing same into the top of said column.

6. The method of claim 5 wherein a higher temperature is maintained below the point of withdrawal of said portion of the upwardly flowing paraffin at about the midpoint than above said point of withdrawal.

7. The method of claim 5 wherein the weight ratio of aqueous acid-containing solution to said mixture of pyridines is within the range of 15:1 and 25:1, the weight ratio of paraffins to said mixture of pyridines is within the range of 3:1 and 10:1 and wherein said portion of the upwardly flowing liquid paraffin phase withdrawn at about the midpoint of the column is from one-sixth to one-third of the total of said stream plus the stream withdrawn from the top of said column.

8. A method for resolving a mixture of alkenylpridines having solely alkyl substituents and at least one alkenyl substituent with the double bond in the alpha position and having only 2 to 10 carbon atoms in side chains and alkylpyridines having solely alkyl substituents and having 1 to 10 carbon atoms in side chains, said method comprising establishing a countercurrent, intimate-contact flow of an acidic aqueous solution of a material selected from the group consisting of inorganic acids and inorganic acid salts thereof having a pH in the range of 2 to 7 and a liquid paraffin hydrocarbon of 3 to 8 carbon atoms per molecule; introducing said mixture of pyridines into said flow at a point removed from the end of aqueous solution introduction; withdrawing from a second point in said flow, removed from and between said first-mentioned point and the end of paraffin introduction, a portion of the flowing paraffin phase having dissolved therein pyridines enriched in said alkylpyridines; and withdrawing from the end of aqueous solution introduction paraffin having dissolved therein pyridine enriched in said alkenylpyridine.

References Cited in the file of this patent

UNITED STATES PATENTS

| | | |
|---|---|---|
| 2,716,120 | Haskell | Aug. 23, 1955 |
| 2,758,141 | Findlay | Aug. 7, 1956 |
| 2,773,918 | Stephens | Dec. 11, 1956 |